(12) United States Patent
Li et al.

(10) Patent No.: US 8,084,009 B2
(45) Date of Patent: Dec. 27, 2011

(54) METHOD FOR MAKING CARBON COMPOSITE MATERIAL

(75) Inventors: Ya-Dong Li, Beijing (CN); Wei Chen, Beijing (CN); Xiao-Ling Xiao, Beijing (CN); Chen Chen, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 132 days.

(21) Appl. No.: 12/462,154

(22) Filed: Jul. 30, 2009

(65) Prior Publication Data
US 2010/0239486 A1 Sep. 23, 2010

(30) Foreign Application Priority Data
Mar. 19, 2009 (CN) .......................... 2009 1 0106317

(51) Int. Cl.
*C01B 31/00* (2006.01)
*C01B 31/30* (2006.01)
(52) U.S. Cl. .................................... 423/415.1; 423/439
(58) Field of Classification Search .......... 423/414–444, 423/445 R; 502/416–439; 252/500, 502
See application file for complete search history.

(56) References Cited

U.S. PATENT DOCUMENTS
2006/0165995 A1* 7/2006 Im et al. ...................... 428/408

FOREIGN PATENT DOCUMENTS
CN 1167614 C * 9/2004

OTHER PUBLICATIONS

Li, et al., Establishing Microporosity in Open Metal-Organic Frameworks: Gas Sorption Isotherms for Zn(BDC) (BDC=1,4-Benzenedicarboxylate), J. Am. Chem. Soc. 1998; 120: 8571-8572.*
Li, et al. Coordinatively Unsaturated Metal Centers in the Extended Porous Framework of Zn3(BDC)3•6CH3OH (BDC=1,4-Benzenedicarboxylate), J. Am. Chem. Soc. 1998; 120: 2186-2187.*
Eddaoudi, et al., Highly Porous and Stable Metal-Organic Frameworks: Structure Design and Sorption Properties, J. Am. Chem. Soc. 2000; 122: 1391-1397.*

* cited by examiner

*Primary Examiner* — Daniel C. McCracken
(74) *Attorney, Agent, or Firm* — Altis Law Group, Inc.

(57) ABSTRACT

A method for making a carbon composite material, the method including providing a 1,4-benzenedicarboxylate-metal complex in a vessel, putting the vessel carrying the 1,4-benzenedicarboxylate-metal complex into an environment with a protective gas therein, and heating the 1,4-benzenedicarboxylate-metal complex to a temperature in a range from about 500° C. to about 1300° C.

20 Claims, 5 Drawing Sheets providing a 1,4-benzenedicarboxylate-metal complex in a vessel putting the vessel carrying the 1,4-benzenedicarboxylate-metal complex into an environment with a protective gas therein heating the 1,4-benzenedicarboxylate-metal complex to a temperature in a range from about 500 °C to about 1300 °C

METHOD FOR MAKING CARBON COMPOSITE MATERIAL

BACKGROUND

1. Technical Field

The present disclosure relates to a method for making a carbon composite material.

2. Description of Related Art

Carbon composite materials, serving as, for example, gas sensitive material or electrode material, can be applied to a variety of fields. A sol-gel method is a conventional method for making the carbon composite material. The sol-gel method includes making an organic sol with metal, forming a gel with the organic sol, forming an organic gel by exchanging water in the gel with other substances, such as an organic solvent, obtaining an impure aerogel by drying the organic gel at a supercritical point, and carbonizing the impure aerogel. The method for making the organic sol further includes supplying a raw material; hydrolyzing the raw material, or inducing a condensation reaction in the raw material, and so on.

However, in the above-mentioned method, the raw material is expensive, and some organic raw materials are harmful to one's health. Further, the conventional method is time-consuming, and often requires several days or even weeks. Moreover, drying at a supercritical point requires a high-pressure device, therefore, the cost for making the carbon composite material is high.

In order to solve the above problems, Zhu et al. provide a method for making a carbon composite material. The method is disclosed in a Chinese patent issued Sep. 22, 2004, CN1167614C, and entitled "Method for making metal carbon composite nanomaterial". The method includes the following steps of mixing bitumen, concentrated sulfuric acid, and concentrated nitric acid, and conducting a nitration-oxidation reaction to get a first mixture, filtrating the first mixture to get a filter cake, dissolving the filter cake with a strong base to get a second mixture, filtrating the second mixture to acquire a filtrate, adding hydrochloric or nitric acid to the filtrate to cause the filtrate flocculate to acquire a carbon gel, heating the carbon gel to get a carbon sol, mixing and drying the carbon sol after adding a metal salt liquor into the carbon sol to acquire an explosive precursor, and exploding the explosive precursor using heat initiation.

However, the method disclosed by Zhu et al. is still complicated and also dangerous because of the acids used and the explosive nature. Further, the method is costly.

What is needed, therefore, is a method for making a carbon composite material that is easy, safe, and low cost.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present method for making a carbon composite material.

Figure 1:
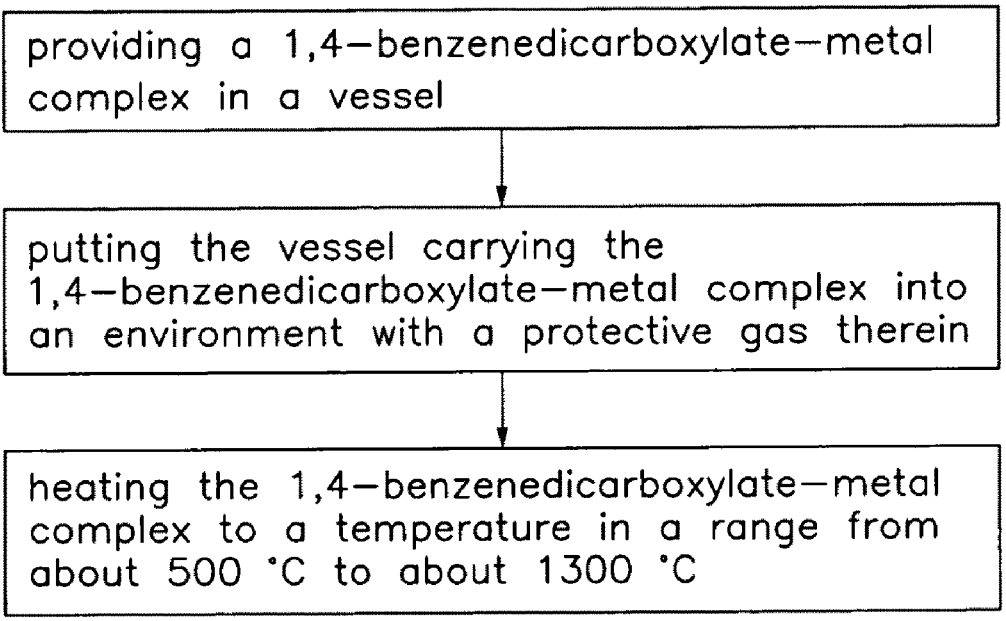
FIG. 1 is a flow chart of one embodiment of a method for making a carbon composite material.

Corresponding reference characters indicate corresponding parts throughout the several views. The exemplifications set out herein illustrate at least one embodiment of the present method for making a carbon composite material, in at least one form, and such exemplifications are not to be construed as limiting the scope of the present disclosure in any manner.

DETAILED DESCRIPTION

Referring to FIG. 1, one embodiment of a method for making a carbon composite material includes:

(a) providing a 1,4-benzenedicarboxylate-metal complex (M(BDC)) in a vessel;

(b) putting the vessel carrying the M(BDC) into an environment with a protective gas therein; and (c) heating the M(BDC) to a temperature in a range from about 500° C. to about 1300° C.

In step (a), the vessel can be a ceramic boat, or other ceramic or quartz container. The method for making the M(BDC) includes:

(a1) dissolving a metal salt in a first solvent to get a first solution;

(a2) mixing terephthalic acid with an alkaline solution in a second solvent to get a second solution;

(a3) mixing the first solution and the second solution together at room temperature to obtain a mixture; and (a4) filtrating the mixture to obtain a filter cake, and drying the filter cake.

In step (a1), the metal salt can be metal chloride, metal sulfate, metal nitrate, metal acetate, and any combination thereof. The metal element in the metal salt can be transition metal including zinc, cadmium, manganese, cobalt, nickel, copper, and any combination thereof. The first solvent can be water, such as distilled water.

In step (a2), the second solvent can be the same as the first solvent. The molar ratio of the terephthalic acid to the metal salt is less than or equal to 1:1. In one embodiment, the molar ratio of the terephthalic acid to the metal salt is 1:1. The alkaline solution is added to the second solvent to accelerate dissolving the terephthalic acid. The alkaline solution can be sodium hydroxide liquor, ammonia liquor, sodium carbonate liquor, sodium bicarbonate liquor, potassium carbonate liquor, potassium bicarbonate liquor, and any combination thereof.

In step (a3), the mixture is obtained by agitating the first solution and second solution for a time period of about two hours to twelve hours at room temperature. Agitating time varies from the solubility of the M(BDC). Specifically, the higher the solubility of M(BDC), the longer the agitating time and vice versa.

In step (a4), the filter cake is eluted by deionized water, then dried to obtain the M(BDC). The filter cake is eluted to remove possible residuum in the filter cake, and purify the filter cake. The possible residuum can be the remains of the alkaline solution, the metal salt, the terephthalic acid, and/or other impurities. The method for drying the filter cake includes vacuum drying, freeze drying, pneumatic drying, or natural drying.

In step (b), the protective gas consists of nitrogen gas and an inert gas. The inert gas may be helium, neon, argon, krypton, or xenon.

In Step (c), the M(BDC) is heated for a predetermined time to make sure the M(BDC) completely decomposes into the carbon composite material. In one embodiment, the predetermined time is about one hour to three hours. After the step (c), the method for making the carbon composite material further includes reducing the temperature of the carbon composite material to room temperature.

The carbon composite material can be a metal oxide-carbon composite material or a metal-carbon composite material according to the varied chemical properties of the metal elements (e.g., according to varied activation of metal chemical properties). Generally, when a metal has active chemical properties, the metal can be easily combined with oxygen to form a metal oxide, so the carbon composite material can be easily changed to a metal oxide-carbon composite material. When a metal does not have active chemical properties, it is difficult for the metal to combine with oxygen to form a metal oxide, so the carbon composite material can be a metal-carbon composite material. In one embodiment, when the metal is zinc, cadmium, manganese, and any combination thereof, the carbon composite material can be a metal oxide-carbon composite material, and when the metal is cobalt, nickel, copper, and any combination thereof, the carbon composite material can be a metal-carbon composite material.

EXAMPLE 1

A method for making an embodiment of zinc oxide-carbon composite material (ZnO—C) is described as follows.

Firstly, zinc-1,4-benzenedicarboxylate (Zn(BDC)) is provided.

About 10 mmol of zinc salt is added into about 50 ml of distilled water to get a first solution. About 10 mmol of terephthalic acid and about 20 mmol of sodium hydroxide liquor are then added into about 100 ml of distilled water and agitated to dissolve the terephthalic acid to get a second solution. The second solution and the first solution are mixed together and agitated for about five hours at room temperature to obtain a mixture. The mixture is filtrated to acquire a filter cake. The filter cake is then eluted with about 50 ml of deionized water, and finally dried to obtain the Zn(BDC).

The zinc salt can be zinc chloride, zinc sulfate, zinc nitrate, zinc acetate, and any combination thereof. In one embodiment, the zinc salt can be zinc sulfate. The method for drying the eluted filter cake can be executed by heating the eluted filter at about 50° C.

Secondly, Zn(BDC) is placed in a ceramic boat with argon gas therein.

Thirdly, Zn(BDC) is decomposed by heating to produce ZnO—C. Specifically, Zn(BDC) is heated for about two hours at about 800° C. The temperature is then naturally reduced to room temperature to acquire the ZnO—C.

Figure 2:
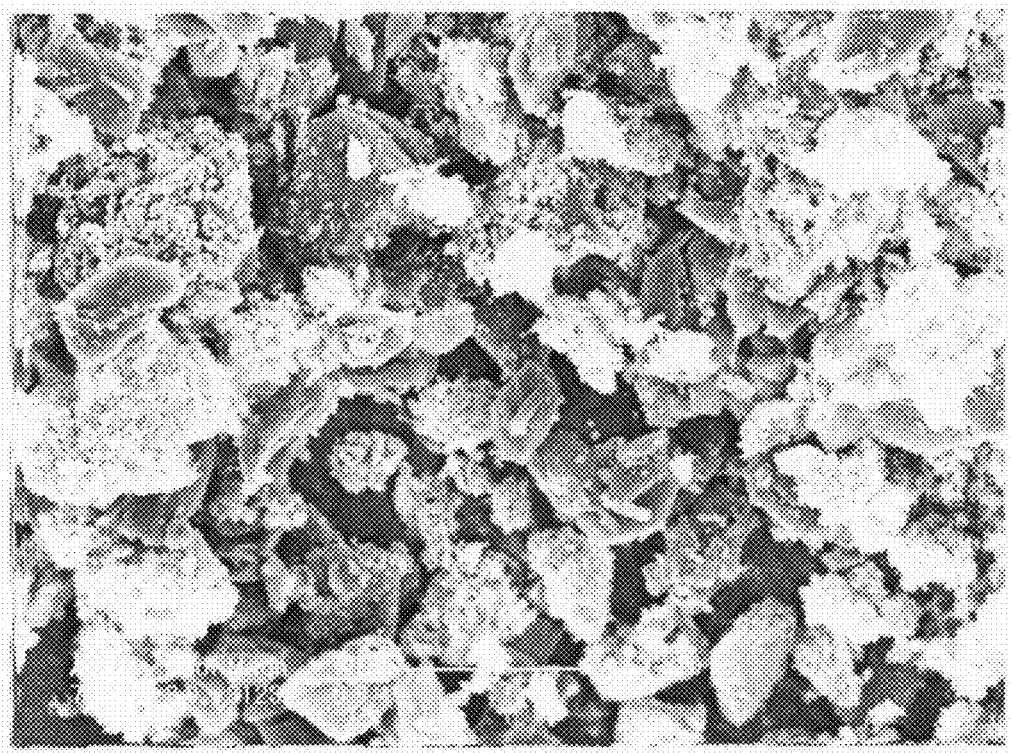
FIG. 2 shows a Scanning Electron Microscope (SEM) image of an embodiment of a zinc oxide-carbon composite.

Referring to FIG. 2, the diameter of a ZnO—C particle is less than or equal to 10 micrometers. ZnO can be used as a gas sensitive material, and the carbon in ZnO—C can improve the adsorption property of ZnO, attributed to a porous structure of the carbon in ZnO—C. The improved adsorption property of ZnO is beneficial to enhance the gas sensitive characteristics of ZnO. Thus, ZnO—C is suitable as a gas sensitive material, and can be used in gas sensors and petroleum desulfuration material, for example.

It can be understood that the zinc salt in the present embodiment can be replaced by cadmium salt, thereby a cadmium oxide-carbon composite material (CdO—C) can be acquired. CdO—C also can be used as a gas sensitive material.

EXAMPLE 2

An embodiment of a method for making manganese oxide-carbon composite material (MnO—C) is described as follows.

Firstly, manganese-1,4-benzenedicarboxylate (Mn(BDC)) is provided.

About 10 mmol of manganese salt is added into about 50 ml of distilled water to get a first solution. About 10 mmol of terephthalic acid and about 20 mmol of potassium bicarbonate liquor are then added into about 100 ml of distilled water and agitated to dissolve the terephthalic acid to acquire a second solution. The second solution and the first solution are mixed together, and agitated for about three hours at room temperature to obtain a mixture. The mixture is filtrated to acquire a filter cake. The filter cake is then eluted with about 50 ml of deionized water, and finally dried to obtain the Mn(BDC).

The manganese salt can be manganese chloride, manganese sulfate, manganese nitrate, manganese acetate, and any combination thereof. In one embodiment, the manganese salt can be manganese nitrate. The method for drying the eluted filter cake can be executed by heating the eluted filter at about 50° C.

Secondly, Mn(BDC) is placed in a quartz container with nitrogen gas therein.

Thirdly, Mn(BDC) is decomposed by heating to produce MnO—C. Specifically, Mn(BDC) is heated for about two hours at about 600° C. The temperature is then naturally reduced to room temperature to acquire the MnO—C.

Figure 3:
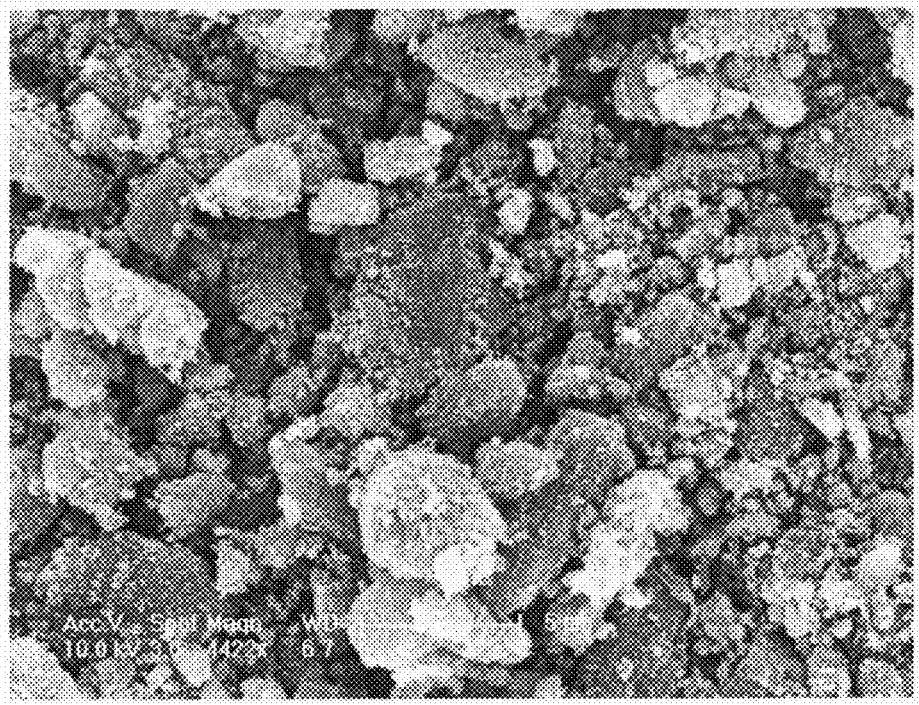
FIG. 3 shows an SEM image of an embodiment of a manganese oxide-carbon composite.

Referring to FIG. 3, the diameter of an MnO—C particle is less than or equal to 5 micrometers.

The method for making MnO—C is similar to the method for making ZnO—C. But, MnO—C and ZnO—C have different applications. MnO—C is suitable as an anode of Lithium-ion battery material, because MnO can be used as an anode of Lithium-ion battery material, and C in MnO—C has conductivity.

EXAMPLE 3

An embodiment of a method for making cobalt-carbon composite material (Co—C) in accordance is described as follows.

Firstly, cobalt-1,4-benzenedicarboxylate (Co(BDC)) is provided.

About 10 mmol of cobalt salt is added into about 50 ml of distilled water to get a first solution. About 10 mmol of terephthalic acid and about 25 mmol of ammonia liquor are then added into about 100 ml of distilled water, and agitated to dissolve the terephthalic acid to acquire a second solution. The second solution and the first solution are mixed together, and agitated for about twelve hours at room temperature to obtain a mixture. The mixture is filtrated to acquire a filter cake. The filter cake is then eluted with about 50 ml of deionized water, and finally dried to obtain the Co(BDC).

The cobalt salt can be cobalt chloride, cobalt sulfate, cobalt nitrate, cobalt acetate, and any combination thereof. In one embodiment, the cobalt salt can be cobalt nitrate.

Secondly, Co(BDC) is placed in a ceramic boat with nitrogen gas therein.

Thirdly, Co(BDC) is decomposed by heating to produce Co—C. Specifically, Co(BDC) is heated for about one hour at about 900° C. The temperature is then naturally reduced to room temperature to acquire Co—C.

Figure 4:
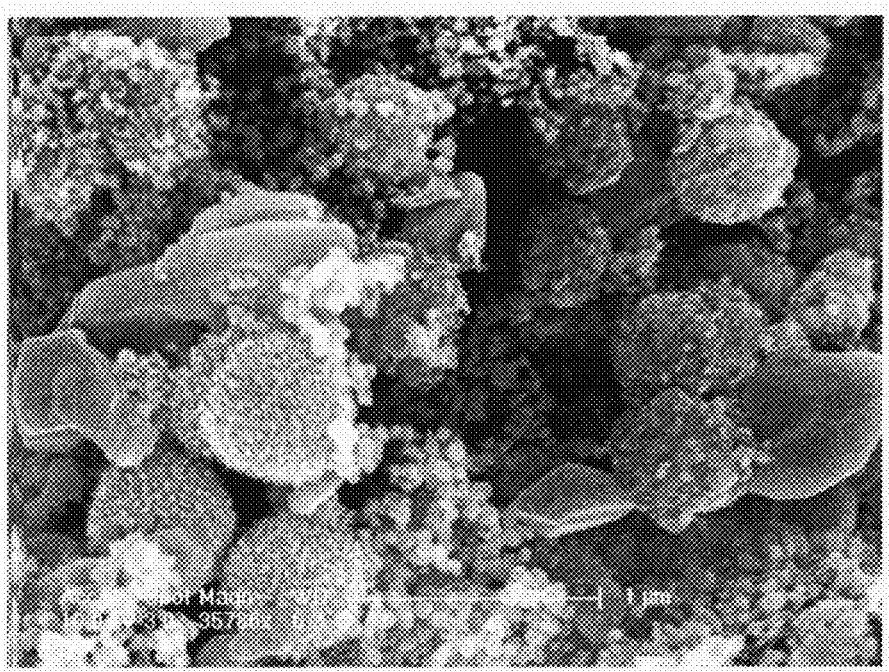
FIG. 4 shows an SEM image of an embodiment of a cobalt-carbon composite.

Referring to FIG. 4, the diameter of a Co—C particle is less than or equal to 1 micrometer.

The method for making Co—C is similar to the method for making ZnO—C. But Co—C and ZnO—C have different applications. Co can be used as a catalyst, and C in Co—C can strengthen the absorption property of Co, attributed to a porous structure of C in Co—C. The strengthened adsorption property of Co is beneficial to enhance the catalyst property of Co. Thus, Co—C is suitable as a composite catalyst material.

EXAMPLE 4

An embodiment of a method for making nickel-carbon composite material (Ni—C) is described as follows.

Firstly, nickel-1,4-benzenedicarboxylate (Ni(BDC)) is provided.

About 10 mmol of manganese salt is added into about 50 ml of distilled water to get a first solution. About 10 mmol of terephthalic acid and about 20.2 mmol of sodium hydroxide liquor are then added into 100 ml of distilled water, then agitated to dissolve the terephthalic acid to acquire a second solution. The second solution and the first solution are mixed together, and agitated for about twelve hours at room temperature to obtain a mixture. The mixture is filtrated to acquire a filter cake. The filter cake is then eluted with about 50 ml of deionized water, and finally dried to obtain the Ni(BDC).

The nickel salt can be nickel chloride, nickel sulfate, nickel nitrate, nickel acetate, and any combination thereof. In one embodiment, the nickel salt can be nickel chloride.

Secondly, Ni(BDC) is placed in a ceramic boat with argon gas therein.

Thirdly, Ni(BDC) is decomposed by heating to produce Ni—C. Specifically, Ni(BDC) is heated for about two hours at about 1000° C. The temperature is then reduced to room temperature to acquire Ni—C.

Figure 5:
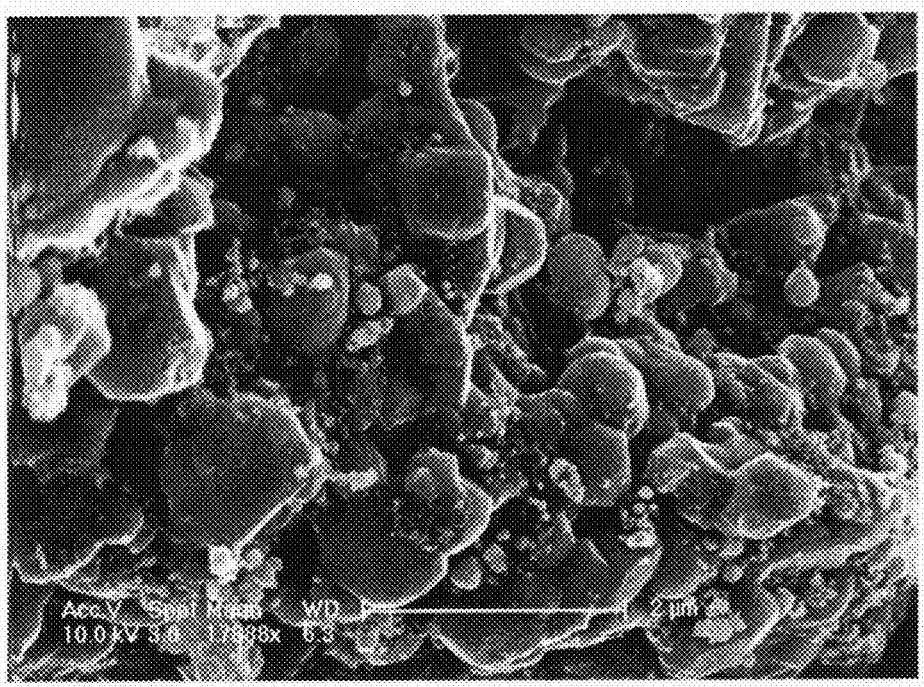
FIG. 5 shows an SEM image of an embodiment of a nickel-carbon composite.

Referring to FIG. 5, the diameter of an Ni—C particle is less than or equal to 2 micrometers.

The method for making Ni—C is similar to the method for making ZnO—C. But, Ni—C and ZnO—C have different applications. Ni can be used as a catalyst, and C in Ni—C can strengthen the absorption property of Ni, attributed to a porous structure of C in Ni—C. The strengthened absorption property of Ni is beneficial to enhance the catalyst property of Ni. Thus, Ni—C is suitable as a composite catalyst material.

It can be understood that the cobalt salt or nickel salt in the methods above can be replaced by copper salt, thereby a copper-carbon composite material (Cu—C) can be acquired. Cu—C also can be used as a composite catalyst material.

The method for making the carbon composite material has many superior properties. Firstly, since the terephthalic acid in BDC has a high carbon element content, the carbon composite material can be acquired by the thermal decomposition of BDC, the method has a short period, is safe, and easy to operate, and conducive to a mass production in industry. Secondly, the raw material has a low cost. Thirdly, carbon in the carbon composite material can strengthen the absorption property of metal oxide or metal, and can also strengthen the conductivity of the metal oxide anode material, so the carbon composite material can be used as a gas sensitive material, lithium-ion anode material, catalyst material, and so on.

It is to be understood that the above-described embodiment is intended to illustrate rather than limit the embodiments. Variations may be made without departing from the spirit of the embodiments as claimed. The above-described embodiments are intended to illustrate and not restrict the scope of the present disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a carbon composite material, the method comprising:
   (a) providing a 1,4-benzenedicarboxylate-metal complex in a vessel, wherein step (a) comprises;
   (a1) dissolving a metal salt in a first solvent to obtain a first solution;
   (a2) mixing terephthalic acid with alkaline solution in a second solvent to obtain a second solution, wherein a molar ratio of the terephthalic acid to the metal salt is about 1:1;
   (a3) mixing the first solution and the second solution together at room temperature to obtain a mixture; and
   (a4) filtrating the mixture to obtain a filter cake, and drying the filter cake
   (b) putting the vessel carrying the 1,4-benzenedicarboxylate-metal complex into an environment with a protective gas therein; and
   (c) heating the 1,4-benzenedicarboxylate-metal complex to a temperature in a range from about 500° C. to about 1300° C.

2. The method of claim 1, wherein the first solvent or the second solvent is distilled water.

3. The method of claim 1, wherein the mixture is agitated for a period of time ranging from about two hours to about twelve hours at room temperature.

4. The method of claim 1, wherein the metal salt is selected from the group consisting of metal chloride, metal sulfate, metal nitrate, metal acetate, and any combination thereof.

5. The method of claim 4, wherein the metal salt comprises a metal element selected from the group consisting of zinc, cadmium, manganese, and any combination thereof.

6. The method of claim 1, wherein the alkaline solution is selected from the group consisting of sodium hydroxide liquor, ammonia liquor, sodium carbonate liquor, sodium bicarbonate liquor, potassium carbonate liquor, potassium bicarbonate liquor, and any combination thereof.

7. The method of claim 1, wherein the protective gas consists of nitrogen gas and an inert gas.

8. The method of claim 1, wherein the 1,4-benzenedicarboxylate-metal complex is heated for a period of time ranging from about one hour to three hours.

9. The method of claim 1, further comprising a step of reducing the temperature of the carbon composite material to room temperature after step (c).

10. The method of claim 1, wherein the 1,4-benzenedicarboxylate-metal complex comprises a transition metal.

11. The method of claim 10, wherein the transition metal is selected from the group consisting of zinc, cadmium, manganese, and any combination thereof.

12. The method of claim 11, wherein the carbon composite material comprises metal oxide and carbon.

13. The method of claim 10, wherein the transition metal is selected from the group consisting of cobalt, nickel, copper, and any combination thereof.

14. The method of claim 13, wherein the carbon composite material comprises metal and carbon.

15. A method for making a carbon composite material, the method comprising:
   (a) providing a 1,4-benzenedicarboxylate-metal complex in a vessel;
   (b) putting the vessel carrying the 1,4-benzenedicarboxylate-metal complex into an environment with a protective gas therein; and
   (c) heating the 1,4-benzenedicarboxylate-metal complex to a temperature in a range from above 1000° C. to about 1300° C.

16. The method of claim 15, wherein the 1,4-benzenedicarboxylate-metal complex comprises a transition metal.

17. The method of claim 15, wherein step (a) comprises:
(a1) dissolving a metal salt in a first solvent to obtain a first solution;
(a2) mixing terephthalic acid with alkaline solution in a second solvent to obtain a second solution;
(a3) mixing the first solution and the second solution together at room temperature to obtain a mixture; and
(a4) filtrating the mixture to obtain a filter cake, and drying the filter cake.

18. The method of claim 17, wherein a molar ratio of the terephthalic acid to the metal salt is less than or equal to 1:1.

19. The method of claim 17, wherein the metal salt is selected from the group
consisting of metal chloride, metal sulfate, metal nitrate, metal acetate, and any combination thereof.

20. The method of claim 17, wherein the alkaline solution is selected from the group consisting of sodium hydroxide liquor, ammonia liquor, sodium carbonate liquor, sodium bicarbonate liquor, potassium carbonate liquor, potassium bicarbonate liquor, and any combination thereof.

* * * * *